3,209,033
METHOD OF OXIDIZING OLEFINS TO UNSATURATED ALDEHYDES AND $\alpha,\beta$ UNSATURATED KETONES Adolph C. Shotts, Maplewood, La., assignor, by mesne assignments, to Columbian Carbon Company, a corporation of Delaware
No Drawing. Filed Mar. 11, 1960, Ser. No. 14,175
5 Claims. (Cl. 260—597)

This invention relates to the preparation of an improved oxidation catalyst and is more specifically concerned with preparing catalyst in a novel form and suitable for the oxidation of $\alpha$-olefins such as propylene and isobutylene to their corresponding unsaturated aldehydes or $\alpha,\beta$-unsaturated ketones.

Prior art catalysts utilized heretofore have involved costly materials such as silicon carbide, co-catalysts such as selenium and/or have possessed rather poor properties of selectivity and/or produced excessive amounts of carbon dioxide and/or resulted in poor yields. Selenium is also a very toxic material. Oftentimes, these methods suffer uncontrollable reaction and experience hot spots which complicates obtaining optimum results.

Some prior art cuprous oxide catalysts which do not require the use of selenium, have been made by impregnation techniques. Costly materials such as silicon carbide have been found to be preferred in catalysts made by such a prior art technique. This preference for such a carrier despite its higher cost has been justified by the greater inferiority of catalysts produced with lesser expensive materials when prepared according to the prior art procedures. Regardless of the carrier employed, however, catalysts prepared by impregnation decrease in activity with time due to attrition and other causes. When the catalyst becomes too inactive, it can only be made active again, if ever, by reimpregnation similar to preparing a new catalyst. The catalyst of this invention does not require such comparatively expensive and time-consuming reactivation operations but requires only heating in an air stream and/or treatment with a hydrogen stream.

Other noble attempts to alleviate the above problems have been made and, in some cases, with a degree of partial success; however, the solutions have left a wide margin for improvement. An oxidation catalyst which is superior to those disclosed in the art is highly desirous.

It is therefore an object of the present invention to provide a catalyst for the oxidation of olefins which does not incorporate or co-function with materials which are relatively expensive and/or difficult to recover and/or extremely toxic to personnel.

It is another object to provide an oxidation catalyst in a form which results in superior yields of the desired aldehyde or $\alpha,\beta$-unsaturated ketone and lesser amounts of undesired byproducts.

It is still another object to provide an oxidation catalyst in such a form that the oxidation reaction may be controlled and whereby hot spots and consequential detrimental effects will be obviated.

It is yet another object to provide for more efficient utilization of the olefins to be oxidized.

To the accomplishment of the foregoing and related ends, an oxidation catalyst is prepared by mixing solutions of sodium metasilicate and cupric nitrate to form a copper silicate precipitate which is subsequently reduced by the action of elemental hydrogen to a precipitate product containing at least some cuprous oxide.

The catalyst of this invention differs from other similar catalysts in the particular form achieved by the specific treatment. The reasons for the desired superior effects obtained by catalysts of this invention are not well understood. Nevertheless, an endeavor will be made herein to satisfactorily explain this; however it is merely speculative in nature and not intended to be binding, as it may at some time be found wholly or at least partially in error.

It is believed that the superiority of the present catalyst is due to the combined factors of the particular arrangement and orientation of atoms in the crystalline structure and also partially due to the surface characteristics resulting from subsequent hydrogenation. Surface character in the end analysis probably amounts to the creation of active centers in number and manner such that extremely more favorable results inherently obtain on its use in oxidation of olefins. It is believed that hydrogenation of the precipitate causes selective removal of part of the oxygen chemically combined with the copper atoms dispersed throughout the silica composition. The removal of this oxygen creates a cuprous oxide-silica gel foraminate solid wherein the foramen are primarily of atomic scale. For inexplicable reasons, the catalyst of this invention probably possessing these characteristics and resultant advantageous oxygen adsorption attains an optimum in the delicate balance of sufficient catalytic effect, selectively, and excessive catalysis had with prior art catalysts evidenced in those cases by localized uncontrollable reaction and heating with various accompanying ills and absent or improved in processes employing my invention.

Catalyst of this invention presumed to have the above characteristics is prepared by the procedure set forth subsequently.

An actual analysis of the catalyst of this invention by X-ray diffraction appeared to show the precipitate to be copper oxymetasilicate and, after treatment with hydrogen, contained cuprous oxide, cupric oxide, and amorphous silica.

It has been discovered as a feature of this invention that the ratio of cuprous ions to cupric ions, that is, cuprous oxide to cupric oxide in the finished catalyst is of great importance. This has been unknown heretofore and is rather unexpected and surprising. Thus a special ratio between the two oxides of copper should be obtained if the accomplishments of this invention are to be had. This ratio is defined hereinafter in the disclosure.

Catalyst preparation 100 gm. of hydrated copper nitrate was dissolved in 500 ml. of water. Sodium metasilicate, in the amount of 50 gm., was dissolved in 600 ml. of water. The sodium metasilicate solution was added to the copper nitrate solution with agitation. The precipitate was collected by filtration and washed three times with 100 ml. of water to remove copper nitrate and sodium nitrate. The filter cake was dried and heated at 300° C. in a stream of air for two hours. The resulting solid was ground to a fine powder and formed into pellets. After heating for 1 hour at 600° C., the pellets were treated with a slow stream of hydrogen at 155° C. for about 6 hours, whereupon the catalyst preparation was considered complete.

The primary variables of the catalyst preparation are (a) the ratio of copper nitrate to sodium metasilicate, (b) the temperature of the drying and heat treating operation, (c) the temperature of heat treating the catalyst pellets, (d) the temperature of the hydrogenation of the catalyst pellets, and (e) the resultant ratio of cuprous oxide to cupric oxide in the catalyst. All variables permit some latitude of variation; however some do so more than others. In general, the variables will be found suitable in the following ranges:

(a) Ratio of copper nitrate to sodium metasilicate, 2.5/1 to 1/1 and preferably is about 2/1.

(b) The temperature of the drying and heat treating operation is 200° C. to 400° C. and preferably is about 300° C. Usually the drying operation begins with heating for a time at about 100° C. An important object of this step is the removal of the oxides of nitrogen so that a temperature high enough to accomplish such is employed.

(c) The temperature of heat treating the catalyst pellets is 400° C. to 1,000° C. and preferably is about 600° C.

(d) The temperature of the hydrogenation of the catalyst pellets is 130° C. to 250° C. and is preferably about 155° C.

(e) The ratio of cuprous oxide to cupric oxide resulting after the hydrogen treatment should be about 0.1/1 to 1/0.1 and preferably is in the range of about 1/1 to 1.1/0.75.

Other variables in the catalyst preparation such as air flow in drying, hydrogen flow in hydrogenation of the catalyst and time are of lesser importance and will present little problem to those skilled in the art in view of my teachings with respect thereto.

The oxidation of the olefins is carried out in a manner very similar to that when prior art catalysts are employed. For example, by passing a mixture of olefins with gas containing molecular oxygen over the catalyst of this invention at 175° C. to 450° C. and preferably about 400° C. In the case of isobutylene, the ratio to oxygen is in the range of 4 to 1 to 1 to 1 and preferably about 2.4 to 1 and the residence time is preferably about 1 second or less. Sufficient diluent such as steam may be added to the feed to narrow the explosive limits and reduce the hazard of explosion. Additional information on the oxidation procedure may be found in United States Patents Nos. 2,627,527, 2,716,665, 2,670,379, and 2,451,485 should it be desired. It is to be noted, however, that a higher olefin-to-oxygen ratio may be used in this process than in prior art processes which permits recycling of the unreacted olefin. In the prior art processes, the ratios which had to be employed cause unreacted olefins to be sufficiently dilute in the effluent streams as to make recycling commercially unfeasible and consequently is lost.

The following detailed example of the process of oxidizing isobutylene utilizing this invention will be found helpful to the practicing of this invention.

*Oxidation of olefin*

A 100 ml. portion of the above pellets was placed in a stainless steel tube of 0.75 in. diameter and about 2 feet in length.

Isobutylene at 500 ml./min., oxygen at 71.5 ml./min., and steam at 3,300 ml./min. were passed through the packed tube at 400° C. A yield of 19.8 percent (based on oxygen) and a selectivity of 65 percent were realized. The aldehyde is separated and purified by any of the methods known in the art, for example, as disclosed in United States Patent No. 2,606,932.

In the oxidation reaction, other gases may be added to improve results. For example, as above, steam may be employed (preferably 48 percent of the feed) and others not demonstrated here such as isopropyl chloride (preferably 0.045 mole percent based on isobutylene) whereby selectivity is improved further in addition to other advantages.

The catalyst is not limited to use in oxidation of propylene and isobutylene but olefins of the general formula $R-C(CH_2R_2)=CHR_1$ wherein R, $R_1$, and $R_2$ represent hydrogen, straight or branched chain alkyl groups, or alicyclic radicals. Olefins suitable in the oxidation will readily occur to those skilled in the art, as these will recognize that any olefin is suitable which can be vaporized without decomposition. The prior art patents mentioned above give adequate description of the hydrocarbons suitable; therefore further definition of this feature here is unnecessary. A few additional examples to those already named, however, are 2-methyl-2-butene; 2,4-trimethyl-2-butene; 2,4,4-trimethyl-2-pentene; and 2-methyl-1-pentene.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A method of preparing unsaturated aldehydes and $\alpha,\beta$-unsaturated ketones which comprises passing an olefin and an oxygen containing gas over an oxidation catalyst at a temperature of from 175° C. to 450° C., wherein said oxidation catalyst is prepared by precipitating copper silicate followed by treating said copper silicate with elemental hydrogen to partially reduce copper silicate to cuprous oxide, cupric oxide and amorphorus silica to provide a ratio of cuprous ions to cupric ions in the range of 0.1/1 to 1/0.1.

2. A process of preparing unsaturated aldehydes and $\alpha,\beta$-unsaturated ketones which comprises passing an olefin and an oxygen-containing gas over an oxidation catalyst at a temperature in the range varying from 175° C. to 450° C., said oxidation process being characterized further in that dried copper silicate is pelletized, the resulting pellets are heated to 400–1,000° C., said pellets are then treated with elemental hydrogen at 130 to 250° C. to partially reduce said copper silicate to cuprous oxide, cupric oxide and amorphous silica to provide a ratio of cuprous ions to cupric ions therein of 0.1/1 to 1/0.1 and the so-treated copper silicate is employed as the oxidation catalyst.

3. A process according to claim 2 wherein the olefin is propylene.

4. A process according to claim 2 wherein the olefin is isobutylene.

5. A process according to claim 2 wherein the olefin is 2-methyl-1-pentene.

References Cited by the Examiner

UNITED STATES PATENTS

| | | | |
|---|---|---|---|
| 1,823,865 | 9/31 | Swallen | 252—454 X |
| 2,400,959 | 5/46 | Stewart | 252—468 |
| 2,716,665 | 8/55 | Hadley et al. | 252—454 X |
| 2,734,873 | 2/56 | Pitwell et al. | 252—454 |
| 2,783,286 | 2/57 | Reynolds | 252—454 |
| 3,009,960 | 11/61 | Shotts et al. | 260—604 |

Groggings, "Unit Processes in Organic Synthesis," 5th Edition (1958), pp. 486 to 554.

LEON ZITVER, *Primary Examiner.*

JULIUS GREENWALD, *Examiner.*